(12) United States Patent
Taniguchi et al.

(10) Patent No.: US 11,652,374 B2
(45) Date of Patent: May 16, 2023

(54) ROTARY ELECTRICAL MACHINE WITH STATOR CORE HAVING POWDER BODIES WITHIN HOLES

(71) Applicant: DENSO CORPORATION, Kariya (JP)

(72) Inventors: Makoto Taniguchi, Kariya (JP); Akira Fukushima, Kariya (JP); Ken Matsubara, Kariya (JP); Satoshi Doi, Kariya (JP)

(73) Assignee: DENSO CORPORATION, Kariya (JP)

( * ) Notice: Subject to any disclaimer, the term of this patent is extended or adjusted under 35 U.S.C. 154(b) by 501 days.

(21) Appl. No.: 16/701,783

(22) Filed: Dec. 3, 2019

(65) Prior Publication Data

US 2020/0106312 A1    Apr. 2, 2020

Related U.S. Application Data

(63) Continuation of application No. PCT/JP2018/020594, filed on May 29, 2018.

(30) Foreign Application Priority Data

Jun. 6, 2017 (JP) .............................. JP2017-111727

(51) Int. Cl.
  *H02K 1/16* (2006.01)
  *H02K 1/14* (2006.01)

(52) U.S. Cl.
  CPC ............. *H02K 1/165* (2013.01); *H02K 1/148* (2013.01)

(58) Field of Classification Search
  CPC ............ H02K 1/165; H02K 1/16; H02K 1/14; H02K 1/148; H02K 2213/03
  USPC .................... 310/44, 216.086, 433, 216.051, 310/216.069–216.88
  See application file for complete search history.

(56) References Cited

U.S. PATENT DOCUMENTS

| | | | | |
|---|---|---|---|---|
| 4,912,353 A | * | 3/1990 | Kondo | ................... H02K 1/148 310/216.067 |
| 5,859,486 A | * | 1/1999 | Nakahara | ............... H02K 1/148 310/216.084 |
| 7,348,706 B2 | * | 3/2008 | Ionel | ..................... H02K 1/148 310/216.137 |
| 9,246,361 B2 | * | 1/2016 | Yang | ..................... H02K 1/148 |

(Continued)

FOREIGN PATENT DOCUMENTS

JP     H10-150735 A     6/1998
JP     2006-136164 A    5/2006
(Continued)

OTHER PUBLICATIONS

Aug. 14, 2018 Search Report issued in International Patent Application No. PCT/JP2018/020594.

Primary Examiner — Maged M Almawri
(74) Attorney, Agent, or Firm — Oliff PLC

(57) ABSTRACT

A rotary electrical machine is equipped with a rotor that is rotatably supported, and a stator having a stator core that is disposed coaxially with the rotor. The stator core is configured as a plurality of stacked steel plates, and has a yoke portion that is of annular shape, a plurality of teeth extending radially from the yoke portion, and slots between adjacent teeth. A stator winding is wound in the slots. The yoke portion has holes that extend in the stacking direction of the steel plates, at positions of radial-direction extension of the slots, and molded powder bodies formed from a magnetic powder are provided within the holes.

10 Claims, 6 Drawing Sheets

(56) References Cited

U.S. PATENT DOCUMENTS

| | | | |
|---|---|---|---|
| 2004/0070304 A1* | 4/2004 | Enomoto | H02K 15/022 310/216.088 |
| 2005/0067912 A1* | 3/2005 | Murakami | H02K 1/148 310/216.043 |
| 2005/0200226 A1* | 9/2005 | Kim | H02K 1/148 310/216.057 |
| 2009/0289522 A1* | 11/2009 | Buban | H02K 1/148 310/216.113 |
| 2011/0037338 A1* | 2/2011 | Leiber | H02K 15/022 310/216.105 |
| 2012/0007463 A1* | 1/2012 | Taniguchi | H02K 1/165 310/216.051 |
| 2012/0007464 A1* | 1/2012 | Saito | H02K 1/276 29/598 |
| 2012/0058313 A1* | 3/2012 | Nagai | H02K 1/16 228/178 |
| 2012/0112600 A1* | 5/2012 | Kondou | H02K 1/16 310/216.086 |
| 2012/0126659 A1* | 5/2012 | Jurkowski | H02K 1/146 310/216.074 |
| 2012/0275942 A1* | 11/2012 | Knapp | H02K 1/165 310/216.086 |
| 2013/0106214 A1* | 5/2013 | Chang | H02K 3/522 310/71 |
| 2013/0119816 A1* | 5/2013 | Yang | H02K 1/24 310/216.007 |
| 2014/0152127 A1* | 6/2014 | Tang | H02K 1/02 310/43 |
| 2015/0326076 A1* | 11/2015 | Kim | H02K 1/24 310/216.086 |
| 2016/0329794 A1* | 11/2016 | Li | H02K 3/18 |
| 2017/0163104 A1* | 6/2017 | Li | H02K 1/2706 |
| 2017/0288480 A1 | 10/2017 | Murakami et al. | |
| 2018/0131245 A1* | 5/2018 | Hsu | H02K 1/16 |

FOREIGN PATENT DOCUMENTS

| | | |
|---|---|---|
| JP | 2008-125153 A | 5/2008 |
| JP | 2011-244675 A | 12/2011 |
| JP | 2015-076973 A | 4/2015 |
| JP | 2016-025724 A | 2/2016 |

* cited by examiner (a)

(b)

ROTARY ELECTRICAL MACHINE WITH STATOR CORE HAVING POWDER BODIES WITHIN HOLES

CROSS-REFERENCE TO RELATED APPLICATION

This application is the U.S. bypass application of International Application No. PCT/JP2018/020594 filed May 29, 2018 which designated the U.S. and claims priority to Japanese Patent Application No. 2017-111727, filed Jun. 6, 2017, the contents of which are incorporated herein by reference.

TECHNICAL FIELD

The present disclosure relates to a rotary electrical machine.

BACKGROUND

A stator core of a rotary electrical machine is generally formed by stacking a plurality of electromagnetic steel plates made of a soft magnetic material. Methods of fixedly attaching the stacked electromagnetic steel plates are known whereby the sheets are welded along the stacking direction, or are press-fitted and fastened by crimping. Construction of the stator core by stacking electromagnetic steel plates is done for the purpose of increasing the electrical resistance of the stator core, by electrically dividing the stator core along the thickness direction. This suppresses the flow of eddy currents that are generated by induced voltages caused by fluctuations of stray magnetic flux that flows in directions orthogonal to the main flux linkage directions within the core. However, when the magnetic steel plates are joined by welding, the electrical resistance may become reduced at the welded portions, so that eddy currents can readily flow. In addition, if each electromagnetic steel plate is fastened by crimping, the insulation coating on the surface of the electromagnetic steel plates may be damaged due to mechanical friction between convex and concave contact surfaces, reducing the electrical resistance, so that eddy currents may readily flow, as with the case of welding. If eddy currents can readily flow in that way, there is a concern that this may become an obstacle to efficient equipment design.

SUMMARY

In a rotary electrical machine according to an aspect, the rotary electrical machine includes a rotatably supported rotor, and a stator having a stator core disposed coaxially with the rotor.

The stator core is configured by stacking a plurality of steel plates, and having an annular yoke portion and a plurality of teeth extending radially from the yoke portion, with slots provided between adjacent teeth, and with a stator winding being wound around the slots.

The yoke portion has holes extending in the stacking direction of the steel plates, at positions where the slots extend radially, and molded powder bodies formed from a magnetic powder are provided in the holes.

BRIEF DESCRIPTION OF THE DRAWINGS

The above objects and other objects, features and advantages of the present disclosure will be made clearer by the following detailed description, given referring to the appended drawings. In the accompanying drawings.

DETAILED DESCRIPTION OF THE PREFERRED EMBODIMENTS

Figure 1:
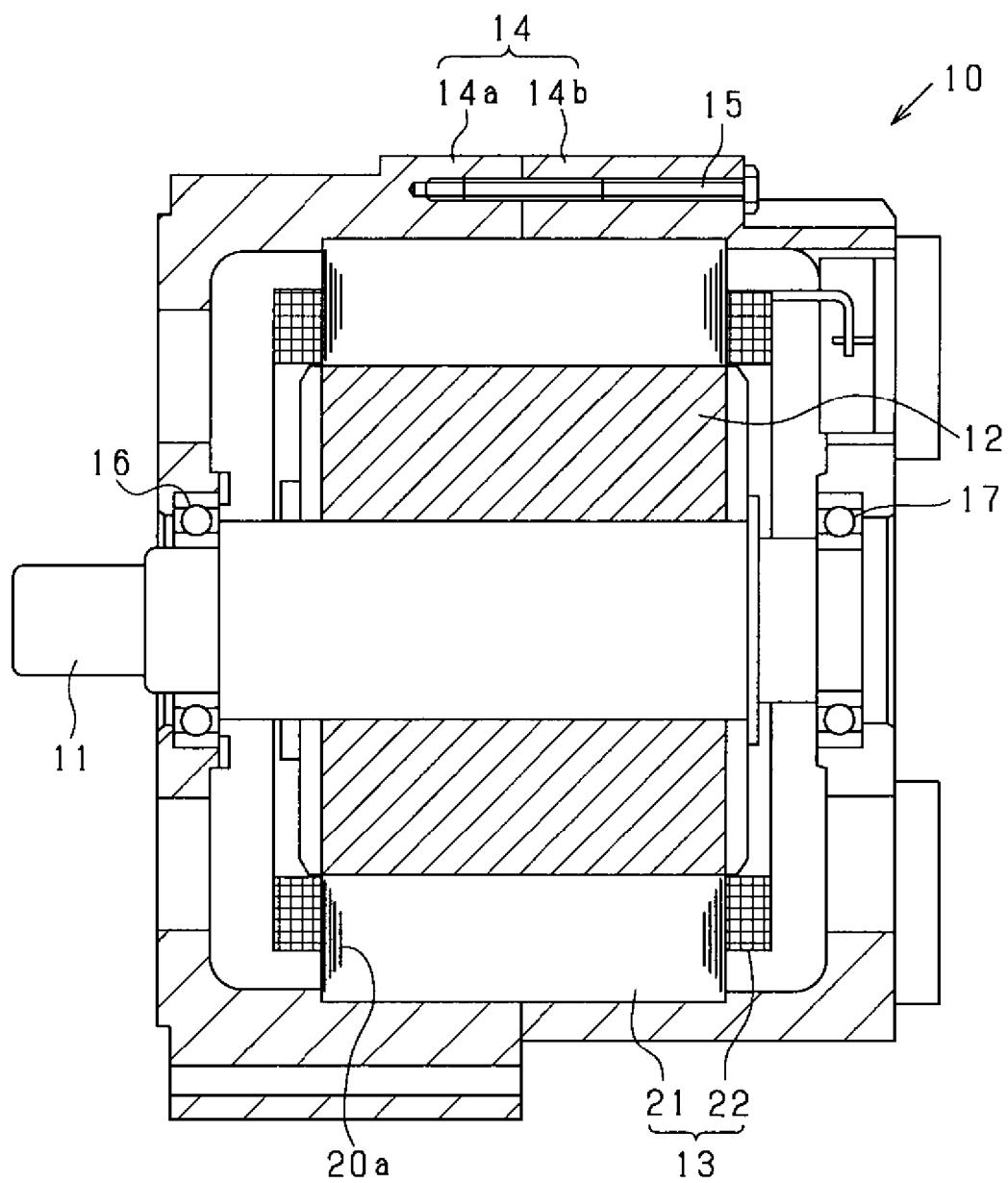
FIG. 1 is a longitudinal cross-sectional view of a rotary electrical machine.

For example, in JP 2008-125153 A, a configuration for a stator of a rotary electrical machine is disclosed having a cylindrical stator iron core (stator core) and a plurality of auxiliary iron cores that are manufactured by compression molding of a metal magnetic powder, and treatment with an insulating film. An auxiliary iron core has a rod-shaped core portion, and a heat-radiating portion integrally formed at one end thereof. The rod-shaped iron core portion is inserted into a slot of the stator core, disposed with the heat-radiating portion protruding from a side face of the stator core. With such a configuration, it can be considered that generation of eddy currents is suppressed by means of increasing the electrical resistance through forming the auxiliary iron cores of metal magnetic powder, and by disposing the auxiliary iron cores at peripheral positions of the slots in the stator iron core, However, with the configuration described in JP 2008-125153 A, since the auxiliary iron cores are inserted into the slots of the stator core, there is a concern that a slot area, i.e., an area of the conductor housing portions, becomes sacrificed, and the radial dimension of the yoke portion is reduced. It can be considered that the loss of the slot area increases the resistance value of the stator winding, and is a hindrance to efficient design. Furthermore, sacrificing the radial dimension of the yoke portion may reduce the mechanical rigidity of the yoke portion and lead to vibration noise. In any case, there is a concern that solving this problem will result in the size of the equipment becoming increased.

Further, it is conceivable that the entire stator core or the yoke portion could be formed from a magnetic powder, however, since at present the magnetic properties of magnetic powder are several times lower than that of electromagnetic steel plate, there is a concern that this could cause the performance of the rotary electrical machine to be greatly reduced. Furthermore, there is a concern that the equipment would become increased in size.

The present disclosure is directed to the above problems, and has a main purpose of providing a rotary electrical machine that is capable of suppressing the generation of eddy currents in a stator, while enabling highly efficient performance to be exhibited.

Aspects for solving the above problems and the effects thereof will be described in the following.

In a rotary electrical machine according to a first aspect, the rotary electrical machine includes a rotatably supported rotor, and a stator having a stator core disposed coaxially with the rotor.

The stator core is configured by stacking a plurality of steel plates, and having an annular yoke portion and a plurality of teeth extending radially from the yoke portion, with slots provided between adjacent teeth, and with a stator winding being wound around the slots.

The yoke portion has holes extending in the stacking direction of the steel plates, at positions where the slots extend radially, and molded powder bodies formed from a magnetic powder are provided in the holes.

With the above configuration, holes extending in the stacking direction of the steel plates are provided at positions of radial-direction extension of the slots, and molded powder bodies formed from a magnetic powder are provided in the holes. It can be considered that, in the yoke portion of the stator core, eddy currents are likely to be generated at positions where the slots extend in a radial direction. By providing the molded powder bodies, the electrical resistance can be increased and the magnetic permeability can be decreased, in portions where eddy currents are likely to occur. Suppression of eddy current loss can thereby be aimed at. Further, by limiting the locations of magnetic powder filling to positions of radial-direction extension of the slots, the magnetic flux does not become decreased in most of the portions through which the main magnetic flux flows, so that a lowering of the performance of the rotary electrical machine due to a decrease in magnetic permeability can be prevented.

Furthermore, with a configuration in which molded powder bodies are provided in the holes, the stacked steel plates become fixed together by the molded powder bodies (magnetic powder). Hence, instead of, for example, using welding or crimping, and reducing the number of welding locations or crimping locations, the molded powder bodies can be used as a means for fixedly attaching stacked steel plates. Hence, the problem that arises with the use of many welded portions or crimping portions, whereby the electrical resistance is reduced and eddy currents will readily flow, can be suppressed.

A rotary electrical machine having the above-described configuration enables generation of eddy currents in the stator to be suppressed, and highly efficient performance to be exhibited.

In the rotary electrical machine according to a second aspect, the holes are provided in the yoke portion at positions that are closer to the slots than to the center of the yoke width, in a radial direction.

According to an analysis made by the assignees of the present disclosure, it has been confirmed that positions at which eddy currents are likely to be generated in the yoke portion of the stator core are close to the slots. Hence, the eddy currents can be appropriately suppressed by disposing the holes at positions that are closer to the slots than to the center of the yoke width, in a radial direction.

In the rotary electrical machine according to a third aspect, the holes are formed with a cross-sectional shape in which the circumferential length dimension is larger than the radial length dimension.

The holes in the yoke portion have a cross-sectional shape in which the circumferential-direction length dimension is larger than the radial-direction length dimension. As a result, if the holes are disposed closer to the slots than to the center position of the yoke portion, with respect to a radial direction, the position of a hole is restricted, but the cross-sectional area of the hole (that is, the cross-sectional area of the molded powder body) can be made as large as possible. Hence, it can be expected that eddy currents will be effectively suppressed.

In the rotary electrical machine according to a fourth aspect, the stator core has a plurality of core blocks that are connected in the circumferential direction, and is formed in an annular shape by fixedly attaching adjacent core blocks to each other. Two or more teeth are provided, with a slot being formed between each of respective pairs of adjacent teeth of the same core block and being formed between respective teeth of two adjacent core blocks. The holes and the molded powder bodies are disposed corresponding to slots that are formed between teeth of the same core block, among the plurality of slots.

In a stator core formed by connecting a plurality of core blocks, core block joint portions (joint boundary portions) become disposed along lines of radial-direction extension of the slots, at predetermined intervals. In view of this, it is desirable to dispose the holes and molded powder bodies such as to correspond to slots that are formed between teeth of the same core block, among the plurality of slots. In this case, an appropriate configuration can be realized, taking into consideration the facts that it is relatively difficult for eddy currents to flow at a core block joint portion, and that it is difficult to form a hole at a core block joint portion.

In the rotary electrical machine according to a fifth aspect, the holes are through-holes that penetrate in the axial direction through the stator core, and the molded powder bodies have protruding portions that protrude from the hole at both of the axial-direction side faces of the stator core.

With the above configuration, the molded powder bodies generate compressive loads acting toward the axial-direction center of the stator core. Hence, the plurality of steel plates are compressed from both sides, in the stacking direction, and the reliability of fixedly attaching the stacked steel plates can be further improved.

In the rotary electrical machine according to a sixth aspect, the holes penetrate through the stator core in the axial direction, each hole having expanded-diameter portions that are larger in diameter than the diameter of the axially central portion of the hole, with the expanded-diameter portions being respectively disposed at the axial-direction sides of the stator core, and with the molded powder body being disposed within the hole, including the expanded-diameter portions, between both side faces of the stator core.

With the above configuration, the molded powder bodies generate compressive loads acting toward the axial-direction center of the stator core. Hence, the plurality of steel plates are compressed from both sides in the stacking direction, and the reliability of fixedly attaching each of the stacked steel plates can be further improved. Furthermore, since the molded powder bodies are disposed between the two side faces of the stator core, the molded powder bodies can be prevented from protruding in an axial direction, so that an increase in size can be effectively prevented.

In the rotary electrical machine according to a seventh aspect, crimping portions for fixedly attaching the plurality of steel plates by press-fitting are disposed in the yoke portion, at positions where the teeth extend in a radial direction.

According to an analysis performed for the present disclosure, it has been confirmed that eddy currents are relatively unlikely to occur in the yoke portion at positions of radial extension of the teeth. In view of this point, the yoke portion is configured such that the crimping portions are disposed at positions where the teeth extend in a radial direction. In this case, mechanical characteristics are given priority over the electrical characteristics of the crimping portions, and the attachment force of each steel plate can be enhanced. In short, by providing the molded powder bodies and crimping portions in the yoke portion, and giving priority to the electrical characteristics of the molded powder bodies while also giving priority to the mechanical characteristics of the crimping portions, it becomes possible to design for improvement of both electrical characteristics and mechanical characteristics.

In the rotary electrical machine according to an eighth aspect, in the yoke portion, the positions of the holes and the positions of the crimping portions with respect to a radial direction are respectively different, with the holes being closer to the slots than are the crimping portions.

The positions in a radial direction of the holes (molded powder bodies) and of the crimping portions, in the yoke portion, are made respectively different, with the holes being closer to the slots than are the crimping portions. In this case, the steel plates can be appropriately fixed together in a stacked condition, to form a stator core, while suitably improving the electrical characteristics. In addition, by comparison with a configuration in which the holes and the crimping portions are disposed at the same positions with respect to a radial direction, the distance between the holes and the crimping portion is increased, and changes in electrical resistance within the yoke portion can be made gradual.

In the rotary electrical machine according to a ninth aspect, the electrical resistivity of the molded powder bodies is higher than the electrical resistivity of the crimping portions.

The electrical resistivity of the molded powder bodies is made to have a higher value than the electrical resistivity of the crimping portions. Hence, eddy currents can be suppressed effectively, and the design guideline can be clarified as being a value of a physical property.

In the rotary electrical machine according to a tenth aspect, the stator core is constituted by a plurality of annular-shape core members that are joined together along the axial direction, with each of the core members being formed of the stacked steel plates and having a yoke portion, teeth and slots, and with each of the plurality of core members being provided with the holes and the molded powder bodies in the yoke portion thereof.

With the above configuration, the stator core is constituted by a plurality of annular core members, with the holes and the molded powder bodies being provided in the respective yoke portions of the core members. In this case, the molded powder bodies in the stator core are not provided integrally along the entire thickness direction of the stator core, but are provided in a divided manner for each core member. This prevents the occurrence of an increase in compression load, during the process of forming the molded powder bodies by compression molding of the magnetic powder. Hence, an increase in the size of the manufacturing apparatus can be avoided.

In the rotary electrical machine according to an eleventh aspect, the plurality of core members are stacked such as to be respectively shifted in phase by a predetermined angular amount in the circumferential direction, with the positions of the holes in a core member, with respect to the circumferential direction, being different from the positions of the holes in other core members that are joined thereto.

According to the above configuration, in the stator core, the core members are stacked and joined such as to be respectively shifted in phase in the circumferential direction (rotation direction), thereby suppressing quality deterioration caused by variations in the material of the stator core. This is sometimes referred to transposition, and eliminates magnetic variations and thickness variations in the respective core members. When such transposition is applied, the positions of the holes in the core members may not coincide with each other, so that through-holes may not be formed between the side faces of the stator core. In such a case, it is difficult to fill the holes with magnetic powder, but because molded powder bodies are formed in each of the core members, by filling with the magnetic powder, such a manufacturing difficulty is avoided.

Various embodiments will be described in the following, referring to the drawings. The rotary electrical machine of the present embodiment is used as a power source of a vehicle, for example. However, the rotary electrical machine can be widely applied for industrial use, vehicle use, home appliance use, OA equipment use, game machine use, etc. In the following embodiments, portions that are the same or equivalent to each other are assigned the same reference numerals in the drawings, with the same descriptions being used for portions having the same reference numerals.

A rotary electrical machine 10 according to the present embodiment is an inner rotor type (inner rotation type) of polyphase AC motor, with an outline thereof being shown in FIG. 1. FIG. 1 is a longitudinal cross-sectional view taken along a rotating shaft 11 of the rotary electrical machine 10. In the following description, the direction in which the rotating shaft 11 extends is referred to as an axial direction, a direction extending radially from the rotating shaft 11 is referred to as a radial direction, and a direction extending around the rotating shaft 11 is referred to as a circumferential direction.

The rotary electrical machine 10 includes a rotor 12 that is fixed together to the rotating shaft 11, a stator 13 disposed surrounding the rotor 12, and a housing 14 that accommodates the rotor 12 and the stator 13. The rotor 12 and the stator 13 are arranged coaxially. The housing 14 includes a pair of cylindrical housing members 14a and 14b having bottoms, and is integrated by fastening bolts 15, in a condition in which the housing members 14a and 14b are joined at their respective openings. The housing 14 is provided with bearings 16 and 17, which rotatably support the rotating shaft 11 and the rotor 12.

With the present embodiment, any configuration may be used for the magnetic pole structure of the rotor 12, and hence detailed description is omitted. For example, a magnetic pole structure that is of embedded magnet type, surface magnet type, or basket conductor type, may be used.

The stator 13 has a stator core 21 that is fixed together to the housing 14 such as to be coaxially with the rotor 12, and a stator winding 22 wound around the stator core 21. The method of winding the stator winding 22 can be arbitrarily determined, and may be any of full-pitch winding, short-pitch winding, wave winding, and lap winding.

Figure 2:
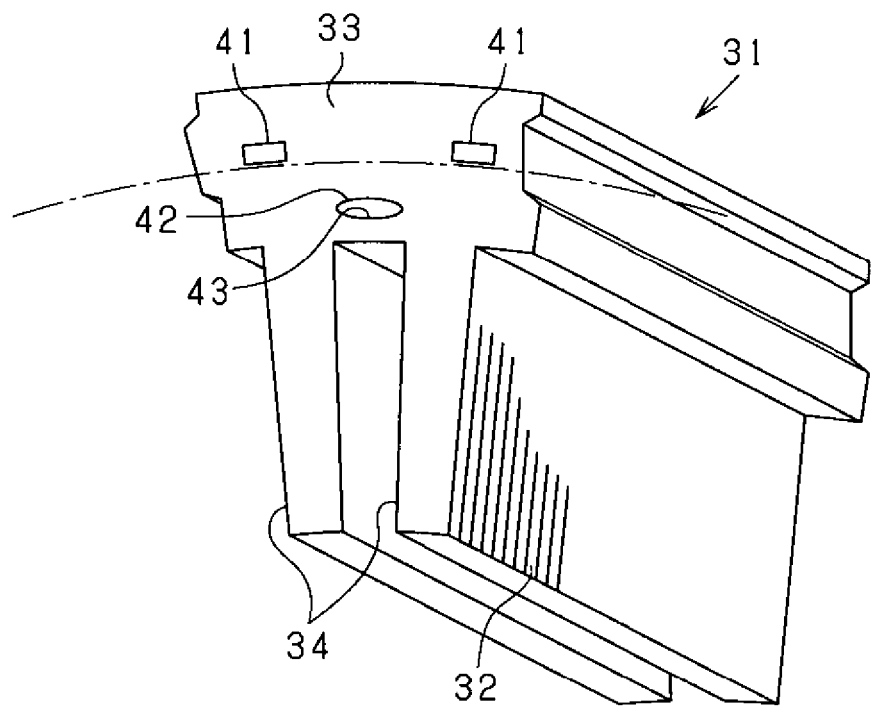
FIG. 2 is a perspective view of a core block.
Figure 3:
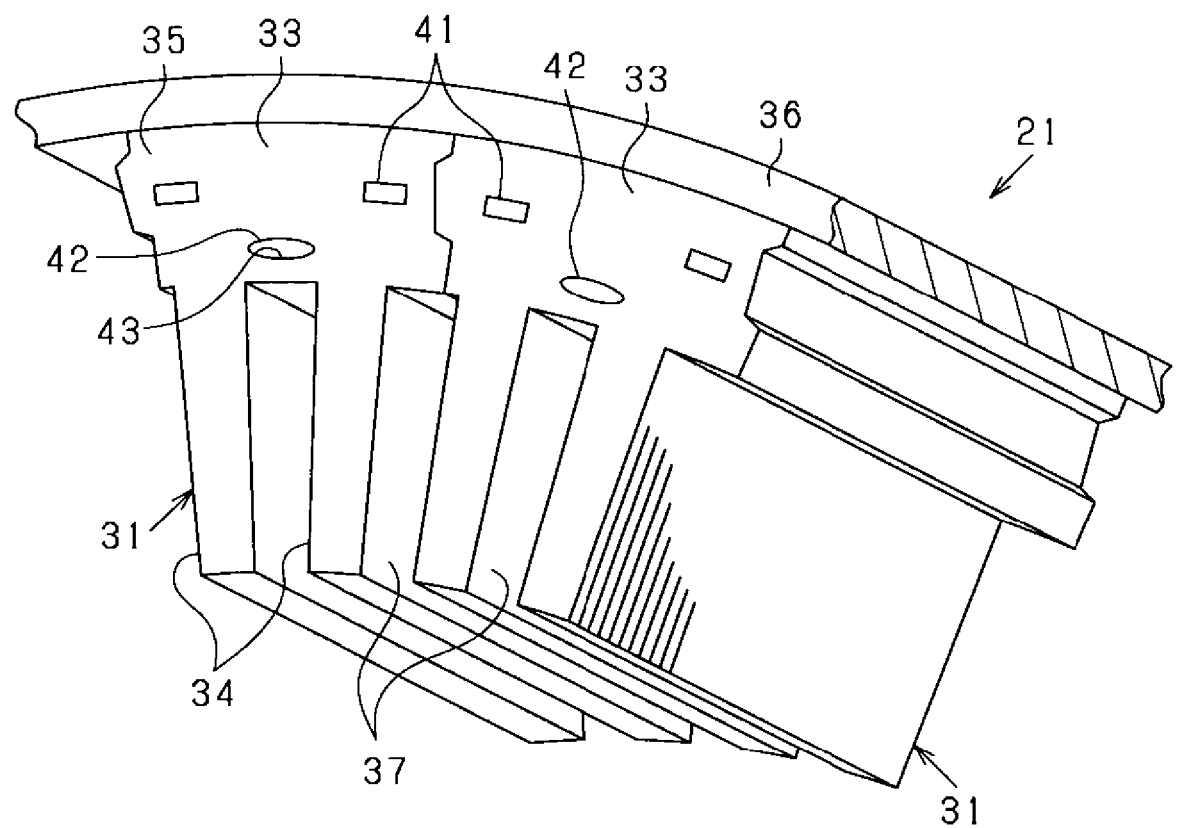
FIG. 3 is a perspective view showing a stator core with a plurality of core blocks in a condition where they are joined together.

The stator core 21 is configured in an annular shape by connecting a plurality of core blocks 31 side by side in the circumferential direction, with details of this being described in the following. FIG. 2 is a perspective view of a core block 31, and FIG. 3 is a perspective view showing the stator core 21 in a condition in which a plurality (two in the diagram) of the core blocks 31 are connected together.

As shown in FIG. 2, a core block 31 is configured by stacking a plurality of thin steel plates 32 (electromagnetic steel plates), made of a soft magnetic material, along the core axial direction, and has an arc-shaped yoke 33 and two teeth 34 projecting radially inward. The steel plate 32 is formed by punching a sheet of electromagnetic steel plate material into a predetermined shape. The core block 31 is formed by attaching together a predetermined number of steel plates 32, in a stacked condition.

In the state in which a plurality of core blocks 31 are connected in the circumferential direction, the yoke portion 35 is formed by connecting the plurality of yokes 33 in an annular shape, and the annular cylindrical member 36 is fitted around the outer periphery of the yoke portion 35. With this embodiment, the stator core 21 is formed by arranging 24 core blocks 31 in the circumferential direction, connecting them in an annular shape. Adjacent core blocks 31 are preferably fixed together to one other by crimping at their joint surfaces.

In a condition in which the stator core 21 is formed in an annular shape by the plurality of core blocks 31, teeth 34 are arranged at predetermined intervals in the circumferential direction, on the inner diameter side of the yoke portion 35, and slots 37 are formed between respective teeth 34. In this case, one of the slots 37 is formed between each pair of teeth 34 of the same core block 31, and one of the slots 37 is formed between respective teeth 34 of each pair of adjacent core blocks 31. The stator winding 22 is inserted into each of the slots 37 in the stator core 21.

Next, crimping portions 41 and molded powder bodies 42 provided in the yoke portion 35 of the stator core 21 will be described.

As shown in FIGS. 2 and 3, the yoke 33 of each core block 31 is provided with crimping portions 41 that are press-fitted and tightened by crimping, at two locations in the circumferential direction. The crimping portions 41 are disposed at positions that are the same with respect to a radial direction and are at locations where respective teeth 34 extend radially outward. The crimping portions 41 are disposed at or near the center position of the yoke width (a position at ½ of the yoke width), with respect to a radial direction.

Furthermore, the yoke 33 is provided with holes 43 (through-holes) penetrating in the stacking direction of the steel plates 32, with molded powder bodies being provided in the holes 43 by filling the holes with magnetic powder. The holes 43 are disposed at positions where the slots 37 extend in the radial direction, and at positions closer to the slots 37 (positions on the inner side, with respect to the radial direction) than the center position of the yoke width, with respect to the radial direction. It should be noted that it would be equally possible for the holes 43 to be disposed such that the center of each hole is closer to a slot 37 than to the center position of the yoke width, with respect to the radial direction. In this case, with respect to the positional relationship in the radial direction between the crimping portions 41 and the holes 43, the crimping portions 41 are disposed at the outer side and the holes 43 are disposed at the inner side.

When each of the steel plates 32 that forms a core block 31 is punched by a press machine, a punched hole is formed, so that when a plurality of the steel plates 32 are stacked, a hole 43 penetrating in the axial direction is formed. The hole 43 has a cross-sectional shape that is elliptical in a plane orthogonal to the axial direction, and in which the length in the circumferential direction is greater than the length in the radial direction. However, the cross-sectional shape of the hole 43 may be other than an elliptical shape, and may be, for example, a circular shape, or a polygonal shape such as a rectangular shape or a triangular shape, etc.

Figure 4:
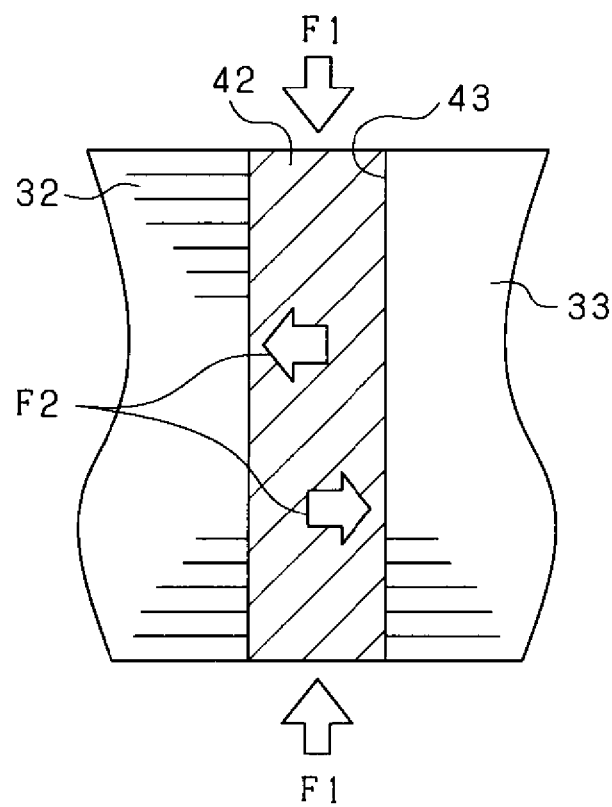
FIG. 4 is a cross-sectional view showing a hole in a core block.

The molded powder bodies are formed by compression molding of magnetic powder in the holes 43. In this case, as shown in FIG. 4, the holes 43 are formed such as to have the same diameter along the axial direction, and each hole 43 is filled with the magnetic powder under a condition in which a load F1 is applied to from both sides of the stator core 21. The magnetic powder body is then hardened, filling the hole 43 without gaps, thereby forming a molded powder body 42. In molded powder body 42 formed as described above, a compressive load F2 (positive stress) is generated, acting toward the cut surface of the hole 43 in the steel plate 32, that is, acting toward the contact interface with the steel plate 32. Furthermore, since the molded powder body 42 is disposed such as to straddle a plurality of stacked steel plates 32, each steel plate 32 becomes fixed together, with the molded powder body 42 as a core material.

The electrical resistivity values of the molded powder bodies 42 and the crimping portions 41 are different, with the electrical resistivity of the molded powder bodies being higher than that of the crimping portions 41.

Figure 5:
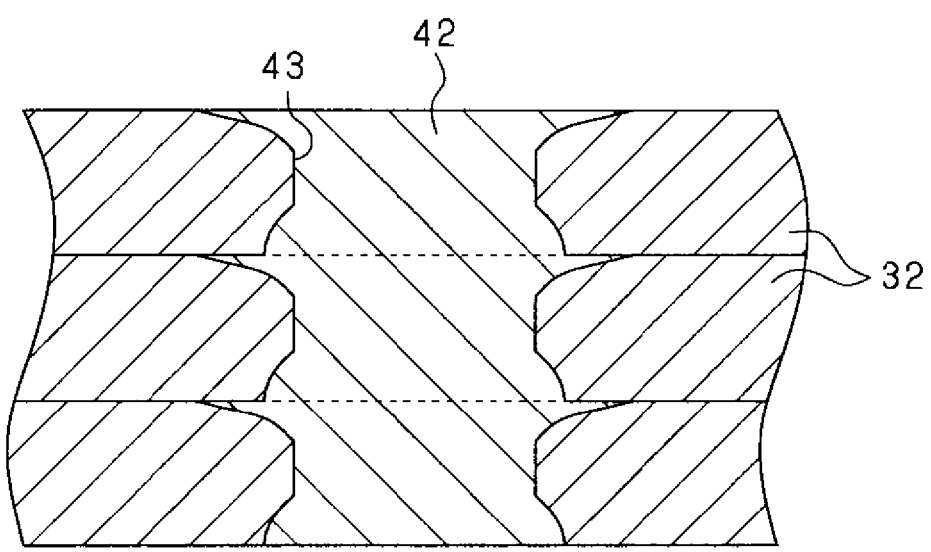
FIG. 5 is a cross-sectional view showing an enlarged view of a stacked portion of steel plates.

Here, as a result of the pressing of the steel plates 32, the cut surface of a steel plate 32 does not become a vertical surface, due to burrs, sag, etc., so that in the stacked state of the steel plates 32, as shown in FIG. 5, unevenness arises at the inner circumferential face of a hole 43 along the stacking direction. In this respect, with the above configuration, since the holes 43 are filled with magnetic powder in a compressed state to form the molded powder bodies 42, then even if the inner peripheral surface of a hole 43 has irregularities, the irregularities become filled with the magnetic powder material. Hence a problem whereby gaps are formed due to unevenness, when the molded powder bodies 42 are molded in the holes 43, and magnetic resistance is unintentionally produced by the gaps, is prevented. Moreover, since the molded powder bodies 42 interfere with each of the steel plates 32, the molded powder bodies 42 are prevented from dropping out.

It should be noted that if a core material that has been previously formed into a rod shape is press-fitted into a hole 43, then with the core material in the press-fitted state, gaps due to irregularities will be formed at the inner peripheral surface of each holes 43. In this case, magnetic resistance could be unintentionally produced, due to the gaps not being filled. Furthermore, there would be concern that the core material might drop out.

With the configuration in which the core blocks 31 are connected in an annular shape as described above, the holes 43 and the molded powder bodies 42 are provided at every other slot in the stator core 21. More specifically, slots 37 at which the hole 43 and the molded powder body 42 are positioned on a line extending in the radial direction from the slot, and slots 37 at which a core block joint (joining boundary) is positioned on a line extending in the radial direction from the slot, are arranged alternating in the circumferential direction of the yoke portion 35.

Figure 6:
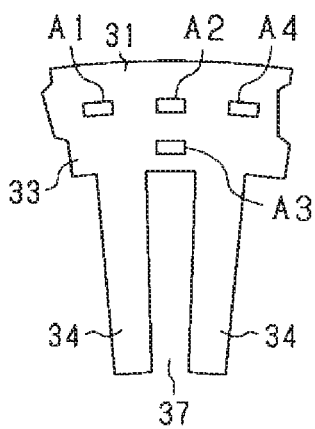
FIG. 6($a$) is a diagram showing a plan view of a core block, and FIG. 6($b$) is a diagram showing differences of eddy currents at each of positions A1 to A4.
Figure 6:
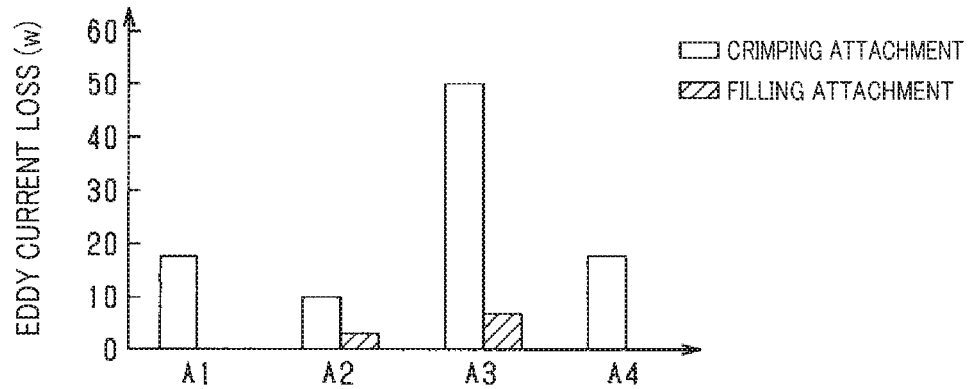

Next, differences in eddy current loss due to differences in the attachment positions of the steel plates 32 in a yoke 33 of the core block 31 will be described, referring to FIG. 6. FIG. 6(a) is a plan view of a core block 31, and FIG. 6(b) is a diagram showing differences in eddy current loss at each of the positions A1 to A4. Here, the calculated values of eddy current loss during no-load operation are shown, for a case in which the stator core 21 is configured by arranging 24 of the core blocks 31 circumferentially. The values apply to a case in which the number of poles is 8 and the motor rotation speed is 9000 rpm.

In FIGS. 6(a), A1 and A4 are positions in a yoke 33 where the teeth 34 extend radially outward, and A2 and A3 are positions where the slots 37 extend radially outward. Of A2 and A3, A2 is a substantially central position (outer circumferential side position) in the yoke width, with respect to a radial direction, and A3 is a position that is closer to the slot 37 (inner circumferential side position) than the central position in the yoke width, with respect to a radial direction.

FIG. 6(b) shows, for each of the positions A1 to A4, differences in eddy current loss due to differences in the attachment method used, for the case in which attachment by crimping is used and the case in which attachment through filling with magnetic powder bodies is used, respectively. It should be noted that for the positions A1 and A4, the results are shown for the case in which only crimping attachment is used, while for the positions A2 and A3, the results are shown for the case in which both crimping attachment and filling attachment are used.

As shown in FIG. 6(b), in a case in which attachment by crimping is performed at positions A1 to A4, which are on lines extending radially from the teeth, the generation of eddy currents is relatively small. Moreover, of the positions A2 and A3 which are on lines extending radially from the slots, although the generation of eddy currents are small at position A2, which is an outer circumferential side position, the generation of significant eddy currents can be confirmed at position A3, which is an inner circumferential side position. In other words, it can be seen that eddy currents are generated to a significant degree at positions that are on lines extending radially from the slots 37.

On the other hand, it can be understood that eddy current loss is greatly reduced when filling with magnetic powder is implemented, at positions A2 and A3. It is estimated that a reduction of approximately 50 W in the eddy current loss can be expected, in the case of operation at 9000 rpm under no load.

Furthermore, with the stator core 21 configured as described above, the core block 31 is formed of a plurality of steel plates 32 made of soft magnetic material, and the locations at which magnetic powder is filled in the yoke 33 are limited to positions of radial-direction extension of the slots 37. For that reason, there is no lowering of the magnetic permeability of most of the portions through which the main magnetic flux flows, and a deterioration in performance of the rotary electrical machine 10 due to decrease of the magnetic permeability can be prevented.

Figure 7:
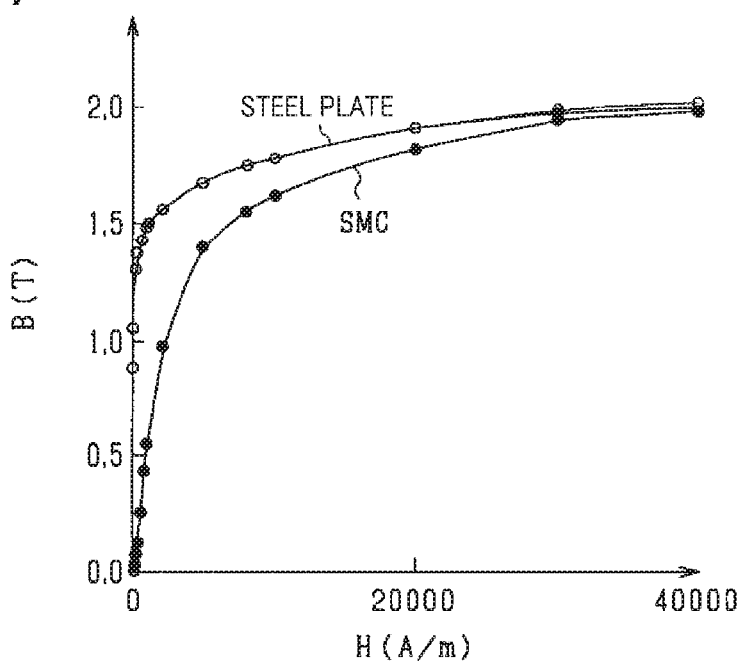
FIG. 7 is a diagram showing the magnetic characteristics of magnetic powder and the magnetic characteristics of electromagnetic steel plate.

FIG. 7 is a diagram comparing the magnetic properties of a magnetic powder (SMC) with those of electromagnetic steel plate. As can be seen from FIG. 7, the slope of the characteristic of the magnetic powder, i.e., of the magnetic permeability, is low in a region where the magnetic field strength H is weak. In this respect, performance degradation can be minimized by minimizing the use of magnetic powder.

In addition, the magnetic powder has an electrical conductivity of 3000 S/m, which is about 1/7 that of the electromagnetic steel plate, which is approximately 23800 S/m, and the magnetic powder is a material in which eddy currents do not readily flow. Actually, since the insulating coating is broken in the uneven crimped portions of the electromagnetic steel plate, the value of electrical conductivity of the electromagnetic steel plate will be several times higher than the previously stated value. Hence, the above-described configuration of the present embodiment maximizes the reduction of eddy current loss, while minimizing performance degradation.

The following valuable effects can be obtained with the embodiment described above in detail.

With the above configuration, in the stator core 21, holes 43 extending in the stacking direction of the steel plates 32 are disposed at positions of radial-direction extension of the slots 32, with molded powder bodies 42 formed from a magnetic powder being provided in the holes 43. It can be considered that eddy currents are likely to be generated in the yoke portion 35 of the stator core 21 at positions of radial-direction extension of the slots 37, however, as described above, the holes 43 are provided, with molded powder bodies 42 formed from a magnetic powder disposed in the holes 43, so that the electrical resistance can be increased and the magnetic permeability can be decreased in the portions where eddy currents are likely to arise. In that way, suppression of eddy current loss can be planned. In addition, by limiting the positions at which the magnetic powder is filled to the positions of radial-direction extension of the slots 37, a lowering of the performance of the rotary electrical machine 10 due to a decrease in magnetic permeability can be prevented.

Furthermore, with a configuration in which the molded powder bodies 42 are provided in the holes 43, the stacked steel plates 32 become fixed together by the molded powder bodies 42 (magnetic powder). Hence the molded powder bodies 42 can be used as a means for fixedly attaching the stacked steel plates, instead of using welding and crimping, or the molded powder bodies 42 may be used in conjunction with a reduction in the number of welding locations and the number of crimping locations. Hence it becomes possible to overcome the problem whereby electrical resistance is reduced and eddy currents readily flow, when large numbers of welded portions and crimping portions are used.

As described above, with a rotary electrical machine 10 having the above-described configuration, generation of eddy currents in the stator 13 can be suppressed, and highly efficient performance can be achieved. These desired effects can be obtained without increasing the size of the rotary electrical machine 10.

Focusing on the fact that eddy currents are likely to occur in the yoke portion 35 of the stator core 21 near the slots 37 (the inner sides of the slots), the holes 43 in the yoke portion 35 are positioned closer to the slots 37 than to the center position of the yoke 35, with respect to a radial direction. In that way, eddy currents can be suppressed more effectively.

The holes 43 in the core block 31 have a cross-sectional shape in which the circumferential-direction length dimension is greater than the radial-direction length dimension. As a result, when the holes 43 in the yoke portion 35 are positioned closer to the slots 37 than to the center position of the yoke 35 with respect to a radial direction, the location of a hole 43 is restricted, but the cross-sectional area of the hole (i.e., the cross-sectional area of a molded powder body 42) can be made as large as possible. Hence, effective suppression of eddy currents can be expected.

In the stator core 21 formed by connecting a plurality of core blocks 31, core block joint portions (joint boundary portions) are provided at positions of radial-direction extension of the slots 37, at predetermined intervals. In view of this, it is desirable to dispose the holes 43 and the molded powder bodies 42 such as to correspond, among the plurality of slots 37, to those slots 37 that are formed between two teeth 34 which are in the same core block 31. An appropriate configuration can thereby be realized, which takes into consideration the facts that, at a joint between core blocks, eddy currents do not readily flow, and it is difficult to form a hole 43.

In view of the fact that eddy currents are relatively unlikely to arise at positions in the yoke portion 35 (yoke 33) where the teeth 34 extend in a radial direction, a configuration is used whereby the crimping portions 41 are disposed at positions of radial-direction extension of the teeth 34. In this case, mechanical characteristics are given priority over electrical characteristics for the crimping portions 41, enabling the attachment force acting on the steel plates 32 to be strengthened. In short, by providing the yoke portion 35 with molded powder bodies 42 for which priority is given to electrical characteristics, and crimping portions 41 for which priority is given to mechanical characteristics, the electrical characteristics and mechanical characteristics can be improved.

The positions of the holes 43 (molded powder bodies 42) and the positions of the crimping portions 41 in the yoke portion 35, with respect to a radial direction, are made respectively different, with the holes 43 being disposed closer to the slots. The steel plates 32 can thereby be appropriately fixed together in a stacked condition, as the stator core 21, while the electrical characteristics can be improved. In addition, the distances between the holes 43 and the crimping portions 41 are greater than for a configuration in which the holes 43 and the crimping portions 41 are disposed at the same positions with respect to a radial direction, so that the variation of electrical resistance within the yoke portion 35 can be made gradual.

The electrical resistivity of the molded powder bodies 42 is made higher than that of the crimping portions 41. Eddy currents can thereby be suppressed effectively, and the design guideline can be clarified as being a value of a physical property.

[Other Embodiments]

The above embodiment may be modified as follows, for example.

Figure 8:
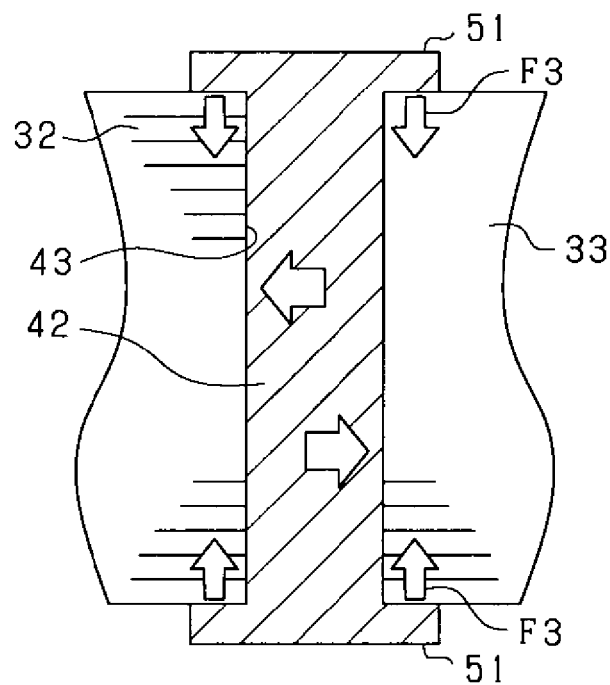
FIG. 8 is a cross-sectional view showing a hole in a core block, having another configuration.

Other configurations for filling and attaching with magnetic powder may be adopted. For example, with the configuration shown in FIG. 8, in a similar manner to that of FIG. 4, a hole 43 (through-hole) is formed in the yoke 33 such as to have the same diameter along the axial direction of the stator core 21. The magnetic powder is filled in the hole 43 under a condition in which loads are applied from both sides of the stator core 21. A molded powder body is then formed in the hole 43 by compression molding of the magnetic powder. In particular, with the configuration of FIG. 8, the molded powder body 42 has protrusions 51 that protrude outward from the holes 43, over each of the axial-direction side faces. A protruding portion 51 has the same cross-sectional shape (for example, elliptical shape) as that of the portion of the molded powder body that is within the hole 43, while the outer dimensions of a protruding portion 51 are larger than those of the portion that is within the hole 43. That is, the cross-sectional area of each portion of the molded powder body that protrudes out of the hole 43 is greater than the cross-sectional area of the portion which is within the hole 43.

In this case, the molded powder bodies 42 generate compressive loads F3 which act toward the axial-direction center of the stator core 21. The plurality of steel plates 32 are thereby compressed from both sides, in the stacking direction, and so the reliability of fixedly attaching the stacked steel plates 32 can be further improved.

Figure 9:
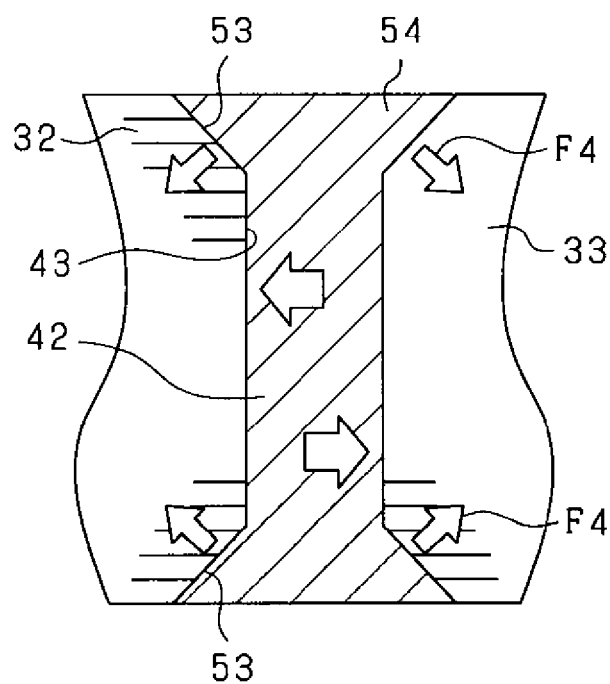
FIG. 9 is a cross-sectional view showing a hole in a core block, having yet another configuration.

Furthermore, with the configuration shown in FIG. 9, a hole 43 in the yoke 33, which penetrates in the axial direction of the stator core 21 has enlarged-diameter portions 53 formed at each of the axial-direction side portions of the stator core 21, with the enlarged-diameter portions 53 having a diameter which is greater than that of the axial center portion of the hole 43. The enlarged diameter portions 53 are formed with a substantially tapered shape, whereby the hole diameter in each of the steel plates 32 increases toward the side faces. The hole 43 is filled with magnetic powder in a condition in which loads are applied from both sides of the stator core 21, and a molded powder body is formed by compression molding. In particular, with the configuration of FIG. 9, the molded powder body provided in the hole 43 includes enlarged-diameter portions 53, between the respective side faces of the stator core 21.

In this case, the molded powder bodies 42 generate compressive loads F4 that act toward the axial-direction center of the stator core 21. Hence, the plurality of steel plates 32 are compressed from both sides in the stacking direction, and so the reliability of fixedly attaching the stacked steel plates 32 can be further improved. Moreover, since the molded powder bodies 42 are disposed between the side faces of the stator core 21, protrusion of the molded powder bodies 42 in the axial direction is suppressed, so that an increase in size can be prevented.

In addition, the enlarged diameter portions 53 do not necessarily need to be substantially tapered, and a configuration may be used in which the hole diameter is the same in each of the steel plates 32, at the enlarged diameter portions 53.

With the above-described embodiment, two teeth 34 are provided in each core block 31, however this may be changed and it would be equally possible to provide three or more teeth 34. In this case, two or more slots 37 will be formed in each core block 31, and holes 43 and molded powder bodies 42 can be provided corresponding to each of these slots 37. It would also be possible to use a configuration whereby holes 43 and molded powder bodies 42 are not provided corresponding to all of the slots 37 in each of the core blocks 31.

In the above embodiment, the annular stator core 21 is formed by connecting a plurality of core blocks 31 in the circumferential direction, however this may be changed. For example, the annular stator core 21 may be formed by stacking a plurality of annular steel plates. In this case the number of attachment locations (powder filling locations) in each steel plate can be greatly reduced, through use of the annular steel plates A configuration may be used in which the stator core 21 is formed by stacking a plurality of annular core members along the axial direction. The stator core 21 shown in FIG. 10 has three core members 61, 62, and 63, and is configured by stacking these core members along the axial direction and attaching them together. Each of the core members 61 to 63 is formed of stacked steel plates, and has a yoke portion, teeth and slots. Holes 43 and molded powder bodies 42 are provided in the respective yoke portions of the core members 61 to 63. In each of the core members 61 to 63, holes 43 and molded powder bodies 42 are not provided corresponding to all slots, but are disposed at a predetermined slot pitch. The numbers and positions of the holes 43 and the molded powder bodies 42 shown in FIG. 10 are specified only as examples.

The core members 61 to 63 are stacked in a condition where they are successively displaced in phase by a predetermined angular amount, in the circumferential direction (rotation direction), and are joined together in a condition whereby what is called transposition has been performed. In this case, deterioration of quality due to magnetic variations and thickness variations between the core members 61 to 63 is suppressed by the transposition of the core members 61 to 63. That is, punching that is executed on an annular steel plate in the process of manufacture is considered to cause anisotropy of magnetic properties in the rolling direction and in a direction at right angles to the rolling direction, and to cause variations in thickness, however these can be equalized by the transposition. Due to the transposition, the positions of the holes 43 and molded powder bodies 42, with respect to the circumferential direction, are different between each of the core members 61 to 63.

Figure 10:
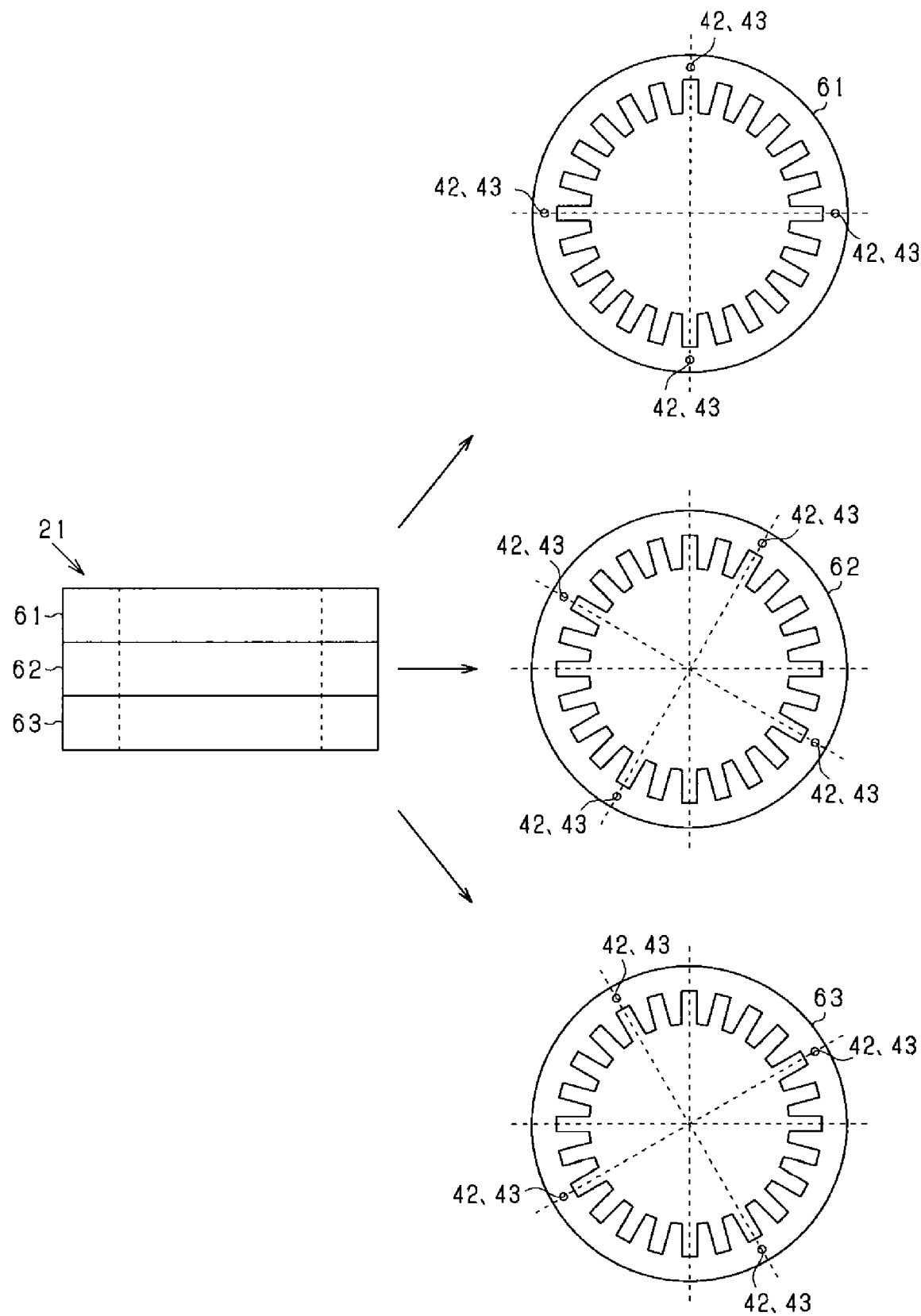
FIG. 10 is a diagram for describing a stator core formed of a plurality of core members.

With the structure shown FIG. 10, the molded powder bodies 42 in the stator core 21 are not provided integrally through the entire core thickness (in the stacking direction), but are disposed such as to be divided among the plurality of core members 61 to 63. As a result, it becomes possible to avoid applying an excessive compression load during the process of forming the molded powder bodies 42 by compression molding of the magnetic powder. Hence, increase in the size of the manufacturing apparatus can be avoided.

In addition, the core members 61 to 63 are stacked such as to be shifted in phase by a predetermined angular amount in the circumferential direction, so that the positions of the holes 43 and the molded powder bodies 42 are respectively different, with respect to the circumferential direction, between the core members which have been joined to each other. When transposition has been performed, the positions of the holes 43 in the core members 61 to 63 may not coincide with each other, so that it may occur that no through-holes are formed between the side faces of the stator core 21. In such a case, it would be difficult to fill the holes 43 with magnetic powder, however since each molded powder body 42 is formed by filling magnetic powder in each of the core members 61 to 63 respectively, the above difficulty in manufacture can be avoided.

In the above embodiment, the holes portion 43 (molded powder bodies 42) are provided in the yoke portion 35 of the stator core 21 at positions closer to the slots 37 than to the center position of the yoke width, with respect to a radial direction. However, for example, the holes 43 (molded powder bodies 42) may be disposed at or near the center of the yoke width, with respect to a radial direction. It would also be possible to dispose the holes 43 and the crimping portions 41 at the same radial positions.

In the above embodiment, both crimping and filling with magnetic powder are implemented as means for fixedly attaching the steel plates 32 in a stacked condition, however, it would be equally possible to attach the steel plates 32 by implementing only the filling attachment. For example, holes 43 and molded powder bodies 42 may be provided in place of the crimping portions 41 in the core block 31 shown in FIG. 2.

In the above embodiment, a configuration has been described in which a rotary electrical machine 10 is embodied as an inner rotor type (inner rotation type) of polyphase AC motor, however the present disclosure is not limited to this. For example, the rotary electrical machine may be embodied as an outer rotor type (external rotation type) of polyphase AC motor. In this case, the rotary electrical machine has a configuration that includes an annular rotor, and a stator disposed on the inner peripheral side of the rotor, with holes extending in the stacking direction of the steel plates being provided at positions where the slots in the yoke portion of the stator core extend radially inward, and with molded powder bodies formed from a magnetic powder being provided in the holes.

The present disclosure has been described based on examples, however it is to be understood that the disclosure is not limited to these examples and structures. The present disclosure also encompasses various modifications and variations that come within an equivalent scope. In addition, various combinations and forms, including combinations and forms containing one element or more, also come within the scope of the present disclosure.

What is claimed is:

1. A rotary electrical machine comprising:
   a rotatably supported rotor; and
   a stator having a stator core that is coaxial with the rotor; wherein:
   the stator core (i) includes a plurality of stacked steel plates and (ii) has a yoke portion of annular shape, a plurality of teeth extending in radial directions from the yoke portion, and slots between adjacent teeth;
   a stator winding is wound in the slots;
   the yoke portion has holes that extend in the stacking direction of the steel plates, at positions of radial-direction extension of the slots;
   molded powder bodies formed from a magnetic powder are in the holes;
   the holes are closer, in a radial direction, to the slots than to a center of a radial width of the yoke portion;
   the stator core comprises a plurality of core blocks that are linked in a circumferential direction;
   each of the plurality of core blocks has two or more of the plurality of teeth;
   the slots are between adjacent teeth of (i) the each of the plurality of core blocks and (ii) adjacent core blocks of the plurality of core blocks; and
   each of the holes and the molded powder bodies corresponds to one of the slots between the adjacent teeth of the each of the plurality of core blocks.

2. The rotary electrical machine according to claim 1, wherein
   the holes have a cross-section in which a circumferential length dimension is larger than a radial length dimension.

3. The rotary electrical machine according to claim 1, wherein
   the holes are through-holes that penetrate the stator core in the axial direction; and
   the molded powder bodies have protrusion portions that protrude out of the holes, over both axial-direction side faces of the stator core.

4. The rotary electrical machine according to claim 1, wherein
   the holes are through-holes that penetrate the stator core in the axial direction and have expanded-diameter portions at both axial-direction side faces of the stator core, with a diameter of the expanded-diameter portions of each of the holes being greater than a diameter of an axial-direction central portion of the each of the holes; and
   the molded powder bodies are between the side faces of the stator core, including in the expanded-diameter portions.

5. The rotary electrical machine according to claim 1, wherein each of the holes does not extend circumferentially beyond a circumferential width of one of the slots.

6. The rotary electrical machine according to claim 1, wherein
   each of the plurality of core blocks comprises (i) a plurality of annular shape core members that are joined along the axial direction and (ii) stacked steel plates, with each of the core members having the slots, the plurality of teeth and the yoke portion; and the holes and the molded powder bodies are in each of the core members.

7. The rotary electrical machine according to claim 6, wherein the plurality of core members are stacked such that the plurality of core members are shifted in phase by a prescribed angular amount in the circumferential direction, with the positions of the holes in each core member of the plurality of core members being different, with respect to the circumferential direction, from the positions of the holes in adjacent core members of the plurality of core members.

8. The rotary electrical machine according to claim 1, wherein the yoke portion has crimping portions at positions of radial-direction extension of the teeth that are configured to fixedly attach the steel plates by compression.

9. The rotary electrical machine according to claim 8, wherein the holes and the crimping portions are at different radial locations in the yoke portion, with the holes being closer to the slots than the crimping portions.

10. The rotary electrical machine according to claim 8, wherein the electrical resistivity of the molded powder bodies has a higher value than the electrical resistivity of the crimping portions.

\* \* \* \* \*